Patented Aug. 20, 1935

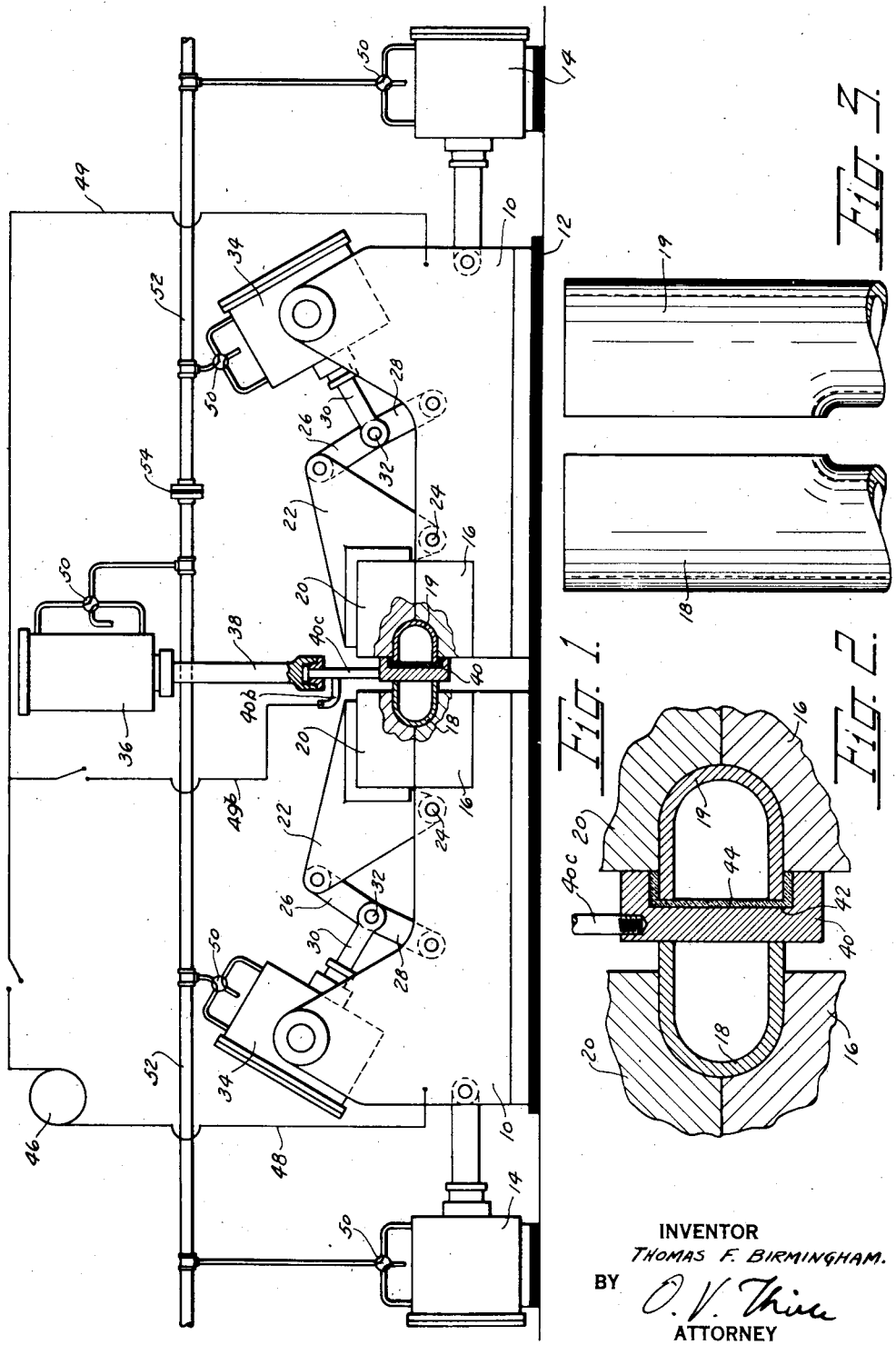

2,011,926

UNITED STATES PATENT OFFICE 2,011,926

ELECTRIC WELDING

Thomas F. Birmingham, Hammond, Ind., assignor to The Superheater Company, New York, N. Y.

Application February 20, 1934, Serial No. 712,114

1 Claim. (Cl. 219—4)

My invention relates to electrically welding relatively high resistance metal parts to those of relatively lower resistance by methods in which the current flows from one part to the other and aims to provide a novel and convenient means for and method of accomplishing the welding of such parts.

In the electric welding of higher resistance metal parts, for instance pieces of alloy steel, to lower resistance metal parts, for instance carbon steel pieces, difficulty has been experienced. The piece of lower resistance is not heated at the same rate by the passage of the current as the piece of higher resistance and the former reaches its welding temperature later, thereby causing trouble in the weld due either to overheating one piece or under heating the other.

I have found by experiment that the percentage of good welds when using stocks of different electrical resistance, for instance chrome steel and carbon steel, can be largely increased by preheating the one of the parts to be welded having the lower resistance, then heating them simultaneously by passing electric current from one to the other until each part is heated to its respective welding temperature, and then forcing them together to weld them.

In order that my invention together with its objects and advantages may be more fully and readily understood, I will now describe in detail, by way of example and in connection with the accompanying drawing, a welding apparatus in accordance with my invention and adapted to operate in accordance with my improved method.

In the drawing,

Fig. 1 is an elevational view, parts being shown in section, of an apparatus in accordance with my invention.

Fig. 2 is a detail sectional view on an enlarged scale of certain parts appearing in Fig. 1.

Fig. 3 is a plan view of two metal parts which it is intended to weld in my apparatus and in accordance with my method.

In the apparatus illustrated in Fig. 1, 10—10 are two base castings slidably mounted on an insulating plate 12 so as to move toward and away from each other. Such relative motion can be produced at will by pistons in cylinders 14, 14 whose piston rods are suitably connected to the castings 10. Fixed in the castings 10 near their adjacent faces are two electrode blocks 16, 16, each of which has a recess near one corner adapted to receive a portion of a piece 18 or 19 which it is desired to weld to the other such piece. Two clamping electrode blocks 20, 20 are also provided, one on each of the castings 10, blocks 20 being fixed to triangular plates 22, 22 which have their lower corners pivoted to the castings 10 at points 24, 24. One of the corners of each plate 22 is pivoted to a toggle link 26, which is pivoted both to a second toggle link 28 and to an operating piston rod 30 at the point 32. The rods 30 are operated by pistons in oscillatory cylinders 34, 34 which are, as are also the links 28, pivotally mounted on the castings 10. It will be seen that when the piston rods 30 are withdrawn, electrode blocks 20 are lifted from the blocks 16, while the thrusting out or forward of the rods 30 forces the blocks 20 down against the blocks 16 to clamp the pieces 18 and 19 therebetween. Blocks 20 also are preferably recessed as shown to receive the parts 18 and 19 to be welded.

It is assumed that the parts 18 and 19 to be welded have different electrical resistances. For instance, if part 18 is of carbon steel and part 19 is of chrome nickel steel, the resistance of part 18 will be very materially lower than that of part 19. It is, of course, very desirable that each have its own proper welding temperature at the time that the two parts are forced together to weld them. In accordance with my improved method, I promote this object by first heating the part 18 having the lower resistance to a higher temperature than the part 19. The apparatus illustrated in the drawing is adapted to carry out such preliminary heating step of one of the parts to be welded. For this purpose, I have illustrated a cylinder 36 within which is a piston whose rod 38 extends substantially at right angles to the path of movement of the castings 10 and the end of which is adapted to support a copper bar 40. By thrusting forward or withdrawing the rod 38 the bar 40 can be thrust in between the parts 18 and 19 or withdrawn therefrom. If now the part 19 is insulated from such copper bar while the part 18 is in contact therewith, a heating current can be passed through the bar 40 and the part 18 without heating the part 19. In the arrangement illustrated, the bar 40 is channeled out as shown at 42 to receive an insulating layer 44, which is bent around the edges of the part 19 so that current cannot pass between part 19 and bar 40. The clamping blocks 20 having been brought down on the parts 18 and 19 and the base castings 10 thrust toward each other, the edges of the part 18 will bear directly and forcibly against the channel or bar 40 so that current may pass from the source 46 through leads 48 and 49 to the castings 10 and thence through the electrodes and the bar 40 to the piece 18 to heat the latter. I prefer also to reduce the resistance in the circuit through parts 18 and 40 to thereby increase the current and decrease the time needed for preheating piece 18 by providing a shunt connection 49b direct from lead 49 to a contact arm 40b on the stem 40c of bar 40. Piece 19 being out of circuit is substantially unheated by such passage of current. The part 18 can thereby be brought up to a suitable temperature above that of the part 19. It will be understood, however, that I do not limit myself to any particular means or method for heating initially one of pieces 18 or 19 and that the apparatus shown is disclosed merely by way of example. The next step in the preferred manner of carrying out my process is to heat the parts 18 and 19 simultaneously until both parts arrive at their welding temperatures. In accomplishing this step in the apparatus illustrated, castings 10 first are drawn back or away from each other and the piston rod 38 lifted to draw the bar 40 from between the blocks 16 and 20. The castings 10 are thereupon manipulated to strike an arc between the edges of parts 18 and 19. Such arc is permitted to play for a length of time determined by experience to give the optimum welding temperatures. Obviously, the current through parts 18 and 19 is the same. The carbon steel of part 18, however, has a considerably lower electrical resistance than that of the alloy steel part 19. The part 18 therefore will receive a lower number of heat units, but this does not result in part 19 reaching its welding temperature ahead of part 18 because part 18 starts at a somewhat higher temperature than the part 19. When parts 18 and 19 are both at welding temperature, they are forced together to weld them. However, I do not limit myself to an electric arcing step in the process even when using electric heating.

It will be seen that two parts 18 and 19 to be welded are illustrated as having the form of hollow U's at the ends of tubes so that, after welding, they become a breeches piece such as that shown in Fig. 2 of Patent 1,255,355 to True et al. dated February 5, 1918. I do not limit myself to any particular form of parts to be welded, however, and neither do I limit myself to any particular metal for the parts to be welded except that the metal of one part has a higher electrical resistance than that of the other.

It will be noted that four way valves 50, 50 are illustrated, one associated with each of the cylinders 14, 34 and 36. Such valves 50 enable the operative to control the pistons in the cylinders as desired by admitting to or discharging from the cylinders motive fluid from piping 52. Preferably an insulating joint 54 is inserted in piping 52 in position to prevent current from circulating in such piping and thereby avoiding the parts to be welded. However, the apparatus shown in the drawing is illustrative merely and I do not limit myself to the features shown and described except insofar as such features are included positively in the claim.

What I claim is:

A welding apparatus having in combination a slidable base block, an electrode block fixedly mounted on said base block, a second electrode block adapted to cooperate with said fixed electrode to clamp a part to be welded and pivotally mounted on said base block, toggle links pivoted together and one pivoted to said pivoted electrode block while the other is pivoted to said base block, and means for operating said toggle to move said pivoted electrode into and out of clamping position.

THOMAS F. BIRMINGHAM.